US012584457B2

(12) United States Patent (10) Patent No.: US 12,584,457 B2

Ravnsbæk-Toft et al. (45) Date of Patent: Mar. 24, 2026

(54) WIND TURBINE

(71) Applicant: VESTAS WIND SYSTEMS A/S,
Aarhus N (DK)

(72) Inventors: Simon Ravnsbæk-Toft, Højbjerg (DK);
Peter Bøttcher, Egå (DK); **Torben
Juul Larsen, Roskilde (DK); Kim
Hylling Sørensen**, Aarhus C (DK)

(73) Assignee: VESTAS WIND SYSTEMS A/S,
Aarhus N (DK)

( * ) Notice: Subject to any disclaimer, the term of this
patent is extended or adjusted under 35
U.S.C. 154(b) by 0 days.

(21) Appl. No.: 18/865,273

(22) PCT Filed: May 12, 2023

(86) PCT No.: PCT/DK2023/050117
§ 371 (c)(1),
(2) Date: Nov. 12, 2024

(87) PCT Pub. No.: WO2023/217342
PCT Pub. Date: Nov. 16, 2023

(65) Prior Publication Data
US 2025/0314232 A1      Oct. 9, 2025

(30) Foreign Application Priority Data

May 12, 2022    (DK) .............................. PA202270250

(51) Int. Cl.
F03D 1/06          (2006.01)
F03D 7/02          (2006.01)
(52) U.S. Cl.
CPC ......... F03D 1/0669 (2023.08); F03D 1/0658
(2013.01); F03D 7/0224 (2013.01); **F05B
2240/917 (2013.01); F05B 2260/79** (2013.01)
(58) Field of Classification Search
CPC ......................... F05B 2240/917; F03D 1/0658
See application file for complete search history.

(56) References Cited

U.S. PATENT DOCUMENTS 7,713,028 B2 *   5/2010   Liao ...................... F03D 1/0675
                                                          416/194
8,485,782 B2 *   7/2013   Turmanidze .......... F03D 7/0236
                                                          416/88

(Continued)

FOREIGN PATENT DOCUMENTS

EP           4006334 A1      6/2022
KR       20140089212 A      7/2014

(Continued)

OTHER PUBLICATIONS

Danish Patent and Trademark Office, 1st Technical Examination
including the Search Report and Search Opinion for Application PA
2022 70250 dated Oct. 16, 2023 (Oct. 16, 2023).

(Continued)

*Primary Examiner* — Justin D Seabe
(74) *Attorney, Agent, or Firm* — Patterson + Sheridan,
LLP; Gero G. McClellan

(57)          ABSTRACT

In a first aspect of the present invention there is provided a
wind turbine comprising a tower, a nacelle mounted on the
tower, and a rotor mounted to the nacelle. The rotor com-
prises a hub and at least three wind turbine blades. Each
blade extends between a root and a tip. Each blade further
comprises a connection point located between the root and
the tip. The wind turbine further comprises a plurality of
blade connecting members, each blade connecting member
being connected between corresponding connection points
of a pair of wind turbine blades. The wind turbine further
comprises a tensioning system for adjusting the tension in
each blade connecting member. The tensioning system com-
prises a plurality of linear actuators, each linear actuator
being coupled between the hub and a respective blade
connecting member. Each linear actuator is configured to
adjust the tension in the blade connecting member.

10 Claims, 3 Drawing Sheets

(56)　　　　　　References Cited

U.S. PATENT DOCUMENTS

2008/0124216 A1　　5/2008　Liao
2010/0259046 A1*　10/2010　Kota .................... F03D 1/0641
　　　　　　　　　　　　　　　　　　　　　　416/223 R
2012/0051912 A1　　3/2012　Shi

FOREIGN PATENT DOCUMENTS

WO　　　　2014187933 A2　　11/2014
WO　　　　2022128040 A1　　6/2022

OTHER PUBLICATIONS

PCT International Search Report and Written Opinion of The International Searching Authority for Application PCT/DK2023/050117 dated Aug. 10, 2023 (Oct. 8, 2023).

* cited by examiner

WIND TURBINE

TECHNICAL FIELD

The present invention relates generally to wind turbines and more particularly to a wind turbine having a rotor comprising at least three wind turbine blades and a plurality of blade connecting members that are each connected between a pair of wind turbine blades.

BACKGROUND

There is a continuing desire to generate increased levels of power from onshore and offshore wind farms. One way to achieve this is to provide modern wind turbines with larger wind turbine blades. The provision of larger blades increases the swept area of the rotor, allowing the wind turbine to capture more energy from the wind. However, wind turbine blades experience various loads and stresses in use, and increasing the length of a wind turbine blade increases the magnitude of loads that the blade, hub, and blade bearing must withstand. For example, flapwise loads resulting from wind pressure on the blade, and edgewise loads resulting from the weight of the blade, are both greater for larger blades.

Wind turbine blades comprise a blade root configured for connecting the blade to the hub of the wind turbine. To help withstand the increased loading in use, longer blades typically have a larger blade root diameter. However, this can make manufacture and transportation of the blade more difficult. In some cases, a support frame or supporting cables may be included on the rotor to transfer some of the blade loads to the hub and/or to other blades. As such, some of the blade loads may bypass the blade root, so the structural requirements for the blade root may be reduced.

However, the loads experienced by a wind turbine blade vary during operation of the wind turbine. For example, loads may vary due to variable wind conditions and/or due to the changing effect of gravity on the blade when the blade is in different positions around the rotor, amongst other factors. As such, the wind turbine and in particular any supporting components on the rotor must be configured to take the varying blade loads into account to ensure safe and reliable operation of the wind turbine.

It is against this background that the present invention has been developed.

SUMMARY

In a first aspect of the present invention there is provided a wind turbine comprising a tower, a nacelle mounted on the tower, and a rotor mounted to the nacelle. The rotor comprises a hub and at least three wind turbine blades. Each blade extends between a root and a tip. Each blade further comprises a connection point located between the root and the tip. The wind turbine further comprises a plurality of blade connecting members, each blade connecting member being connected between corresponding connection points of a pair of wind turbine blades. The wind turbine further comprises a tensioning system for adjusting the tension in each blade connecting member. The tensioning system comprises a plurality of linear actuators, each linear actuator being coupled between the hub and a respective blade connecting member. Each linear actuator is configured to adjust the tension in the blade connecting member.

In preferred examples, the connection point located between the root and the tip is located away from the root of the blade and away from the tip of the blade. For example, the connection point may be located at a distance of at least 20% of the total blade length away from the blade root in some examples. Similarly, the connection point may be located at a distance of at least 20% of the total blade length away from the blade tip in some examples. In preferred examples, the connection point may be located at a distance of at least 30% of the total blade length away from both the blade root and the blade tip. Spacing the connection point away from the blade root ensures that a substantial proportion of the blade loads may be transferred to the blade connecting member via the connection point, bypassing the blade root. Further, spacing the connection point away from the blade tip reduces the effect of increased drag caused by the connection point, and also reduces the noise resulting from the connection point and blade connecting member in use.

Each linear actuator may be directly connected to the hub and/or directly connected to a blade connecting member. Alternatively, each linear actuator may be indirectly connected to the hub via another component and/or indirectly connected to a blade connecting member via another component. As such, "coupled between the hub and a respective blade connecting member" encompasses both direct connection and indirect connection to the hub and the blade connecting member. It will be appreciated therefore that in some examples, the linear actuator may be one of a plurality of components coupled together between the hub and a blade connecting member.

In the present context, 'blade connecting member' should be interpreted broadly to include examples such as flexible connecting members and rigid connecting members. As such, in some examples the blade connecting member may comprise a cable. Preferably the blade connecting member may therefore be a blade connecting cable, and the rotor may be a cable-stayed rotor. For example, in the present context, a 'cable' may be a braided or laid rope of metal wires (such as steel wires, for example), polymer fibres (such as polyethylene, polypropylene, nylon, polyester, aramid fibres, for example), inorganic fibres (such as carbon fibres, for example) or hybrid ropes of such materials. In some other examples, a blade connecting member may comprise a composite member such as a pultrusion, or alternatively a blade connecting member may comprise a metal rod, to name a few possible examples.

The tensioning system may be referred to as a pre-tensioning system in some examples because the tensioning system is preferably configured to pre-tension the wind turbine blades, via the connecting members. Accordingly, the tensioning system may be configured to apply a pre-emptive force in a direction to counteract gravitational and/or wind loading forces experienced by the blade in use. Applying a pre-tensioning force may help to pull the blades of the rotor further upwind, away from the tower, thereby helping to reduce the risk of blades striking the tower in high wind conditions.

Each linear actuator preferably has an adjustable length to facilitate adjustment of the tension in the blade connecting member. It will be appreciated that the length of a linear actuator refers to the distance between the points at which other wind turbine components, such as the hub and blade connecting member for example, may be connected to the linear actuator. The linear actuators may have stroke length of at least 1 m, preferably at least 2 m, and more preferably at least 3 m. The stroke length is the maximum length adjustment facilitated by the linear actuator. The maximum stroke length varies depending on the actual design and the stroke length may for example be at most 6 m, preferably at most 5 m. For example, the stroke length is the difference between a maximum (i.e. extended) length of the linear actuator and a minimum (i.e. retracted) length of the linear actuator. Again, maximum and minimum lengths of the linear actuator refer to maximum and minimum distances between the connection points at which the linear actuator may be connected to other components of the wind turbine.

In preferred examples, the stroke length is configured, or set, in accordance with predicted variations during operation of the wind turbine. For example, factors influencing the configuration of the stroke length include predicted changes in operating conditions, predicted changes to the pre-tension of the blade connecting members for example during maintenance operations, predicted material creep of components coupled between the blade and the hub. A linear actuator is selected with a stroke length that takes into account such variations.

Additionally, the adjustable length of the linear actuators may facilitate improved assembly and maintenance of the wind turbine. For example, the actuators may be fully extended, i.e. to the maximum stroke length, to slacken the blade connecting members when the wind turbine is not in operation. As such, in preferred examples, the linear actuators may be configured with a maximum stroke length that facilitates slackening, i.e. unloading, the blade connecting members. In examples wherein the blade connecting members are flexible members, such as ropes or cables for example, slackening the blade connecting members by extending the linear actuators may facilitate particularly advantageously simplified assembly and maintenance of the wind turbine. In some examples, the facility to extend the actuators and thereby slacken the blade connecting members may mean that maintenance operations can be performed on the blade without disconnecting the blade connecting members from the blades.

In some examples, the linear actuators may be electrical linear actuators. For example, the linear actuators may comprise an electrical motor in some examples. Electrical actuators may facilitate use of standard electrical components, which may reduce the cost of the tensioning system. Additionally, electrical actuators have a reduced risk of fluid leaks, because fluid is only included in small quantities for, for example lubrication of moving parts. Further, in some examples, a wind turbine may comprise an electrical pitch mechanism for adjusting the pitch of a wind turbine blade. In such an example, use of electrical actuators in a tensioning system may be particularly advantageous because the existing electrical infrastructure in the wind turbine can be reused for the electrical linear actuator.

The wind turbine may further comprise a plurality of tension sensors, each tension sensor configured to measure the tension in a respective blade connecting member, and/or in a respective linear actuator. Such a tension sensor may be in contact with, or coupled to, the blade connecting member, or in other examples the tension sensor may be used in determining/estimating the tension in the blade connecting member without being located on or in the blade connecting member.

In preferred examples, the linear actuators may be hydraulic actuators or pneumatic actuators. Advantageously, hydraulic or pneumatic linear actuators facilitate measurement of the tension in a blade connecting member by measuring the fluid pressure in the linear actuator. As such, additional sensors to measure the tension in the blade connecting member may not be necessary and/or may be included purely as a precaution.

Each linear actuator may comprise a piston and the tensioning system may further comprise a plurality of stiffness-response systems each comprising a source of high pressure fluid and a source of low pressure fluid. Each source of high pressure fluid is preferably selectively fluidly coupled to a first side of the piston in a linear actuator and each source of low pressure fluid is preferably selectively fluidly coupled to a second side of the piston in the linear actuator to facilitate control of the stiffness-response of the linear actuator. As such, the stiffness-response of the linear actuator can be controlled, or set, by varying the pressure on each side of the piston, for example by varying the pressure in each of the sources of high and low pressure fluid.

As described previously, the linear actuators may be hydraulic linear actuators or pneumatic linear actuators. As such, it will be appreciated that unless otherwise stated, any reference herein to a "fluid" includes liquids and/or gasses. For example, for a pneumatic linear actuator, the sources of high and low pressure fluid may be sources of high and low pressure gas. For a hydraulic linear actuator, the sources of high and low pressure fluid may be sources of high and low pressure liquid.

The stiffness-response of the linear actuator may also be referred to as the stiffness of the linear actuator. For example, the linear actuator may function as a hydraulic or pneumatic spring. As such, the linear actuator may extend or retract in response to the tension in the blade connecting member in use. The stiffness-response of a linear actuator may therefore be synonymous with a spring constant.

Each linear actuator is preferably fluidly coupled to its respective source of high pressure fluid and to its respective source of low pressure fluid via a respective hydraulic or pneumatic manifold. Such a manifold is preferably formed of substantially rigid piping. With reference in particular to a high pressure manifold fluidly coupling a linear actuator to a source of high pressure fluid, using substantially rigid piping helps to reduce the risk of fluid leaks when the wind turbine is in operation.

In some examples, the source of high pressure fluid may be a high pressure accumulator. Further, in some examples the source of low pressure fluid may be a low pressure accumulator. The pressure in the high and low pressure accumulators may determine the stiffness-response of the linear actuator. In some examples, one or both of the accumulators may be charged by gas pressure. For example, each accumulator may be a piston accumulator, a bladder accumulator, or a membrane/diaphragm accumulator. Each of these types of accumulators comprise a separating element between a gas volume and the high or low pressure fluid volume. Varying the pressure of the gas on one side of the separating element facilitates control of the pressure of the fluid on the other side of the separating element. In some other examples, one or both of the accumulators may be additionally or alternatively charged by a mechanical spring. For example, a mechanical spring may apply a force to one side of the separating element with the high or low pressure fluid acting against the separating element from the other side. As such, the pressure of the high or low pressure fluid in the accumulator may be determined by the mechanical spring.

In some examples, the sources of high pressure fluid may be selectively fluidly coupled to one another. Additionally or alternatively, the sources of low pressure fluid may be selectively fluidly coupled to one another. The sources of high pressure fluid are preferably selectively fluidly coupled to one another via one or more regulator valves. The sources of low pressure fluid are preferably selectively fluidly coupled to one another via one or more regulator valves. During an initial phase, the regulating valves may be opened to fluidly couple the sources of high pressure fluid to thereby equalize the pressure in each of the sources of high pressure fluid. Further, the regulating valves may be opened to fluidly couple the sources of low pressure fluid to thereby equalize the pressure in each of the sources of low pressure fluid, prior to operation of the wind turbine. Following equalization of the pressure in each of the sources of high pressure fluid, and/or equalization of the pressure in each of the sources of low pressure fluid, the regulating valves may be closed to isolate each source of high or low pressure fluid form the other sources of high or low pressure fluid. During operation of the wind turbine, each linear actuator and associated pair of sources of high and low pressure fluid may act as an independent stiffness-response system for a blade connecting member.

In some examples, each linear actuator may be coupled to a respective blade connecting member via a separate tension member. It will be appreciated that the term "tension member" should be interpreted broadly to include examples such as flexible tension members and rigid tension members. As such, in some examples, a tension member may comprise a composite member such as a pultrusion, or alternatively may comprise a metal rod, to name a few possible examples. However, in preferred examples, the tension member may comprise a cable. For example, in the present context, a 'cable' may be a braided or laid rope of metal wires (such as steel wires, for example), polymer fibres (such as polyethylene, polypropylene, nylon, polyester, aramid fibres, for example), inorganic fibres (such as carbon fibres, for example) or hybrid ropes of such materials. Most preferably the tension member comprises a polymer rope, such as a braided polymer rope. For example, a tension member may comprise ultrahigh molecular weight polyethylene fibres, such as Dyneema® DM20 based polymer rope.

It will be appreciated that examples comprising a tension member coupled between the linear actuator and the blade connecting member are examples in which the linear actuator is indirectly connected to the blade connecting member via another component. The tension member in such an example is therefore one of a plurality of components, including the linear actuator, that are coupled between the hub and the blade connecting member. In some other examples, the wind turbine may additionally or alternatively comprise a tension member coupled between the linear actuator and the hub. As such, the linear actuator may be indirectly connected to the hub. However, in preferred examples, the linear actuator may be located as close to the hub as possible, i.e. as far inboard as possible, to reduce the rotational inertia of the rotor.

A separate tension member coupled between the linear actuator and the blade connecting member may facilitate a simpler wind turbine assembly. In particular, in examples where the tension member is a flexible tension member, comprising a rope or cable for example, coupling the linear actuator between the hub and the blade connecting member, via the tension member, may be easier. Further, coupling one or more tension members between the linear actuator and the blade connecting member, and/or between the linear actuator and the hub, may facilitate use of a smaller linear actuator and/or shorter blade connecting member(s), thereby saving cost and weight.

The total distance between the hub and a blade connecting member may be referred to as the tensioning system length. The maximum tensioning system length may be defined by the maximum extended length of the actuator and the length of any tension member via which the actuator is coupled between the hub and the blade connecting member. The tension in the blade connecting member may be adjusted by adjusting the tensioning system length, for example by varying the length of the linear actuator.

The stroke length of each linear actuator, i.e. the maximum length adjustment facilitated by adjusting the length of the linear actuator, may be at least 10%, preferably at least 15%, more preferably at least 20% of the maximum tensioning system length. For example, the maximum tensioning system length may be 15 m, wherein the stroke length of the linear actuator may be 3 m, in some preferred examples.

In some examples, each linear actuator is preferably rotatably coupled to the hub such that the linear actuator is free to rotate relative to the hub. As such, the linear actuator preferably self-orientates in accordance with the tension in the tension member and hence for example takes into account variations in orientation of the tension member due to e.g. wind gusts, pitching, service and/or creep. As such, in preferred examples the extension axis of the linear actuator may be co-axial with the resultant tension force in the respective tension member. Advantageously, such a configuration reduces the risk of moment loads on the linear actuator which could cause wear, damage, or misalignment issues in the linear actuator. Further, such a configuration advantageously reduces fatigue in the tension member.

In preferred examples, each linear actuator may be rotatably coupled to the hub with three rotational degrees of freedom. Such a configuration advantageously ensures that the tension force does not cause any moment forces or torsional loading of the linear actuator during operation of the wind turbine, when blade loads and their magnitude may vary or shift for example during operation (e.g. due to wind gusts, pitching, and/or creep) or during installation or service.

In preferred examples, the hub may comprise an upwind hub extension. That is to say, the hub may comprise an extension component or arrangement that extends in an upwind direction. The linear actuators may be coupled to the upwind extension of the hub. Advantageously, such a configuration may cause the tension in the blade connecting members to pull the wind turbine blades upwind, thereby reducing the risk of the blade striking the tower in a high wind situation. Additionally, such a configuration may effectively increase the stiffness of the wind turbine blade in a spanwise direction. In particular, coupling the linear actuator between the blade connecting member and the upwind hub extension increases the stiffness of an inboard portion of the blade, between the connection point and the root of the blade.

In preferred examples, the linear actuators (or other components of the tensioning system, such as tension members, via which the linear actuators are coupled to the hub) are preferably coupled to the hub at coupling points evenly distributed about the rotation axis of the rotor. As such, the tension forces in the respective linear actuators may substantially cancel one another out. The linear actuators may be coupled to the hub via a suspension bracket. For example, the suspension bracket may define the coupling points. The suspension bracket may help to ensure that the loads transferred from the linear actuators are resolved in the same plane, thereby minimising the loads transferred to the hub.

In some examples, the wind turbine may comprise pitchable wind turbine blades. For example, each wind turbine blade may be rotatably connected to the hub via a pitch mechanism. As such, the rotor may be referred to as a "cable-stayed pitchable rotor" in some examples.

The pitch mechanisms are preferably hydraulic pitch mechanisms. In some examples, the source of high pressure fluid in a stiffness-response system, for example a high pressure accumulator, may be selectively fluidly coupled to a hydraulic pitch mechanism. Additionally or alternatively, in some examples, the source of low pressure fluid in a stiffness-response system, for example a low pressure accumulator, may be selectively fluidly coupled to a hydraulic pitch mechanism. Such a configuration may facilitate simple and efficient supply and removal of hydraulic fluid from the accumulators when required, for example during maintenance operations, during initial turbine assembly and/or as a safety backup system.

In another aspect of the present invention there is provided a method of operating a wind turbine. The wind turbine comprises a tower, a nacelle mounted on the tower, and a rotor mounted to the nacelle. The rotor comprises a hub and at least three wind turbine blades. Each wind turbine blade extends between a root and a tip. Each blade further comprises a connection point located between the root and the tip. The wind turbine further comprises a plurality of blade connecting members. Each blade connecting member is connected between corresponding connection points of a pair of wind turbine blades. The wind turbine further comprises a tensioning system comprising a plurality of linear actuators. Each linear actuator is coupled between the hub and a respective blade connecting member. The method comprises adjusting each linear actuator in dependence on the tension in the respective blade connecting member to thereby adjust the tension in the blade connecting member.

In preferred examples, each linear actuator has an adjustable length. Adjusting each linear actuator therefore preferably comprises adjusting the length of the respective linear actuator to thereby adjust the tension in the blade connecting member. Advantageously this facilitates a simple operation to adjust the tension in a blade connecting member of the wind turbine.

In some examples, the method may comprise setting a target blade connecting member tension and, dependent on the tension in the blade connecting member in use, either a) extending the linear actuator, or b) retracting the linear actuator, to maintain the target tension in the blade connecting member. In preferred examples, maintaining a target tension, or maintaining a consistent tension, may involve maintaining the tension within a predetermined range. For example, the tension may be maintained within a range of 3-10% of the target tension in some examples.

If the tensioning system was rigid, high wind loads may cause the tension in a blade connecting member to increase. However, in such a high wind situation, the linear actuators of the above-described tensioning system may extend, i.e. extending the total tensioning system length, to thereby maintain a consistent tension in the blade connecting member. Further, with a rigid tensioning system set to an appropriate average tension, in a low wind situation the tension in the blade connecting member may decrease substantially such that the blade connecting member goes slack. However, in such a low wind situation, the linear actuators of the above-described tensioning system may retract, i.e. shortening the total tensioning system length, to thereby maintain a consistent tension in the blade connecting member, ensuring that some of the blade loads are still transferred to the blade connecting member. As such, the linear actuators may act in response to external factors, such as wind and/or gravity effects, to maintain a consistent tension in the blade connecting member. Additionally, a tensioning system and use of the tensioning system, as described herein may compensate for other factors such as temperature effects and material creep which may cause variation in the length of the blade connecting members in use.

Further, adjusting a linear actuator, for example by extending or retracting the linear actuator, to adjust the tension in the blade connecting member also adjusts the stiffness of the tensioning system and associated blade connecting member. By facilitating an adjustable stiffness in the blade connecting members and tensioning system, the tensioning system, and use of the tensioning system, as described herein ensures that variable blade loads experienced during operation of the wind turbine are distributed between the blades and the blade connecting members. In preferred examples, the variable blade loads may be equally distributed between the blades and the blade connecting members as a result of the adjustable stiffness of the blade connecting members and the tensioning system.

In some examples, the linear actuators may be hydraulic actuators or pneumatic actuators. In use, the linear actuators may therefore extend and retract as a result of pressure, without any active electronic control input. As such, the extension and retraction of the linear actuators may be described as passive because the extension and retraction of the actuator may occur without an active electrical control input. In use, the linear actuator may therefore be a dumb system, like a spring for example, that only responds passively to external stimuli, such as a change in pressure, which cause the linear actuator to extend and retract. In preferred examples, the tensioning system may be configured to allow the linear actuators to passively extend/retract +/−0.3 m in use, preferably +/−0.45 m in use, more preferably +/−0.6 m in use. In preferred examples, the tension in the blade connecting member may be measured or calculated by measuring the pressure in the hydraulic or pneumatic linear actuator.

For example, during operation of the wind turbine in high wind conditions, or other situations where the blade experiences high loading, the tensioning system, and in particular the linear actuators of the tensioning system, may act as a slave component, following the loads in the blade connecting member and extending the actuator to reduce the tension in the blade connecting member. The linear actuators may be extended passively, i.e. without an active electrical control input, when the blade experiences high loading. Further, during operation of the wind turbine in low load conditions, the linear actuators may act as a master component, and may be retracted to increase the tension in the blade connecting member. This ensures that the blade connecting member is still loaded and held in tension such that at least some blade loads are still transferred to the blade connecting member. The linear actuators may be retracted passively, i.e. without an active electrical control input, in low load conditions.

In some examples, each linear actuator may comprise a piston, and the tensioning system may comprise a plurality of stiffness-response systems. Each stiffness-response system may comprise a source of high pressure fluid and a source of low pressure fluid. Each source of high pressure fluid may be selectively fluidly coupled to a first side of the piston in a linear actuator and each source of low pressure fluid may be selectively fluidly coupled to a second side of the piston in the linear actuator. The method may further comprise controlling the stiffness-response of the linear actuator by controlling the pressure of the high pressure fluid and the pressure of the low pressure fluid. Controlling the stiffness of the linear actuator also results in controlling the combined stiffness of the tensioning system and blade connecting member. Controlling this combined stiffness facilitates control of the load distribution between the blade and the blade connecting cable. For example, if the combined stiffness of the blade connecting cable and tensioning system is increased, this results in a greater proportion of the blade loads being transferred to the blade connecting cable. Accordingly, this enables control of how much load is transferred to the hub via the blade root and inboard portion of the blade and how much load bypasses the blade root and inboard portion and is instead transferred to the hub via the blade connecting member.

In some examples, the source of high pressure fluid may be a high pressure accumulator and the source of low pressure fluid may be a low pressure accumulator. As such, controlling the stiffness-response of the linear actuator may comprise controlling the pressure in the high pressure accumulator and/or controlling the pressure in the low pressure accumulator.

In some examples, the sources of high pressure fluid may be selectively fluidly coupled to one another. Additionally, the sources of low pressure fluid may be selectively fluidly coupled to one another. The method may further comprise equalising the pressure in the sources of high pressure fluid by fluidly coupling the sources of high pressure fluid to one another, rotating the rotor through at least one full rotation, and subsequently fluidly uncoupling the sources of high pressure fluid from one another. The method may further comprise equalising the pressure in the sources of low pressure fluid by fluidly coupling the sources of low pressure fluid to one another, rotating the rotor through at least one full rotation, and subsequently fluidly uncoupling the sources of low pressure fluid from one another. In preferred examples, equalization of pressure in the sources of high pressure fluid, and the equalization of pressure in the sources of low pressure fluid may result in the tension in the blade connecting member being adjusted to the target blade connecting member tension.

BRIEF DESCRIPTION OF THE DRAWINGS

Examples of the present invention will now be described by way of non-limiting example only, with reference to the accompanying figures, in which.

DETAILED DESCRIPTION

Figure 1:
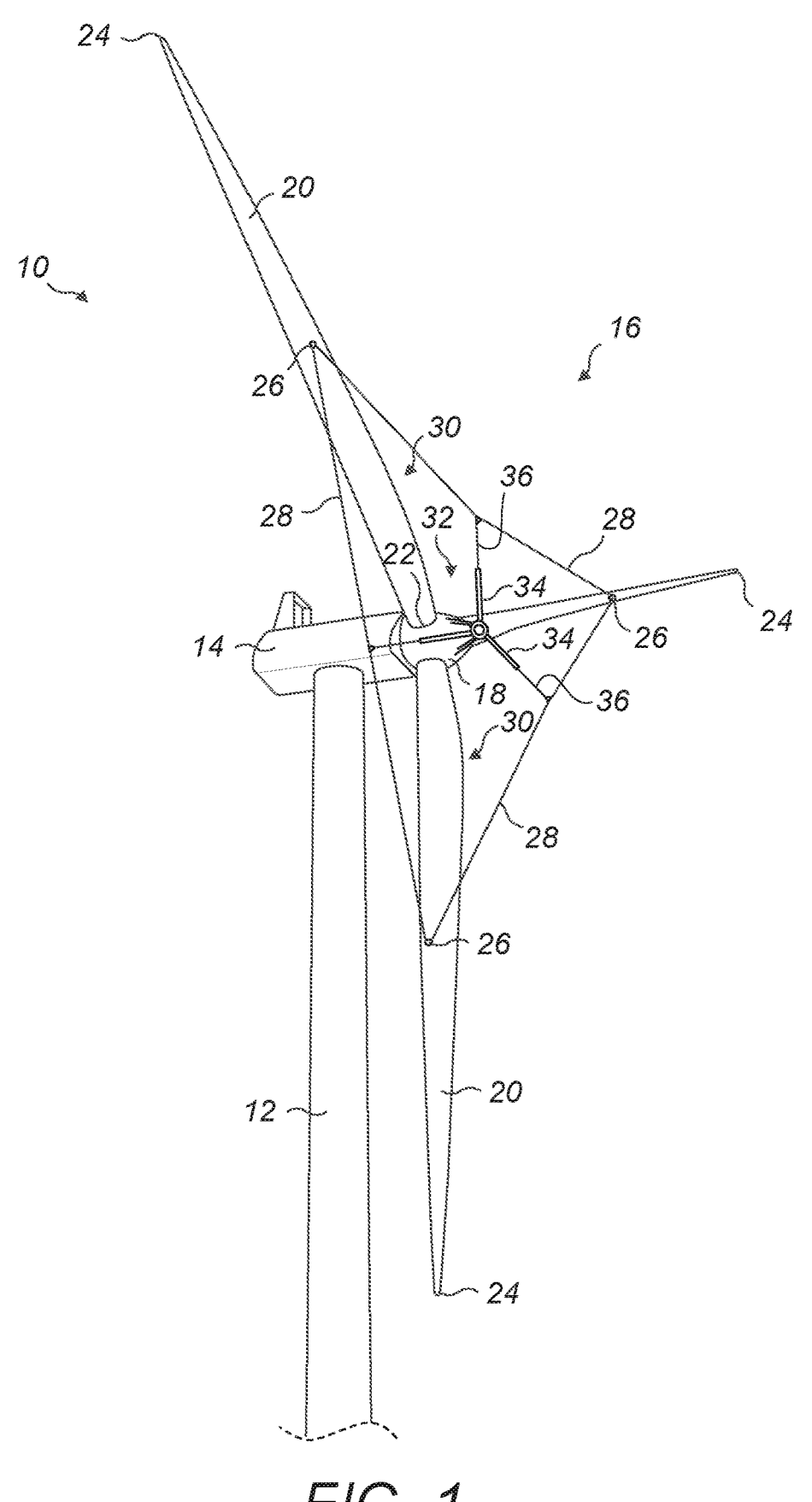
FIG. 1 is a schematic perspective view of a wind turbine comprising a plurality of blades, a plurality of blade connecting members connected between pairs of blades, and a tensioning system for adjusting the tension in the blade connecting members.

FIG. 1 shows a wind turbine 10 comprising a tower 12 and a nacelle 14 mounted on the tower 12. A rotor 16 is mounted to the nacelle 14, and the rotor 16 comprises a hub 18 and a plurality of wind turbine blades 20. In this example, the wind turbine 10 comprises three wind turbine blades 20. The blades 20 may be pitchable wind turbine blades 20, i.e. the pitch of the blades 20 may be adjustable. As such, the wind turbine blades 20 may be connected to the hub 18 via respective pitch mechanisms (not shown), by means of which the blades 20 may be rotated relative to the hub 18. Accordingly, in preferred examples, the pitch of the wind turbine blades 20 can be controlled in dependence on the relative velocity of the incident wind to ensure that the blades 20 are oriented with an advantageous angle of attack for capturing energy from the wind.

Each wind turbine blade 20 extends in a spanwise direction between a blade root 22 and a blade tip 24. The blade root 22 is preferably configured for connection to the hub 18, either directly (as shown in FIG. 1), or via another wind turbine component, such as a blade root extension (not shown). Each blade 20 comprises a connection point 26 located between the root 22 and the tip 24. The connection points 26 of each blade 20 are configured to facilitate connection of a blade connecting member 28 to the wind turbine blade 20. As shown in FIG. 1, the wind turbine 10 comprises a plurality of blade connecting members 28, and each of the blade connecting members 28 is connected between corresponding connection points 26 of a pair of wind turbine blades 20.

The blade connecting members 28 may be flexible connecting members, such as cables, or substantially rigid connecting members, such as rods or pultrusions. In the example shown in FIG. 1, the blade connecting members 28 comprise cables, and the rotor 16 may therefore be referred to as a "cable-stayed rotor". The blade connecting members 28 are configured to transfer some of the loads experienced by the blade 20 in use to another wind turbine blade 20 and/or to the hub 18. In particular, the blade connecting members 28 reduce the loads experienced by an inboard portion 30 of the blade 20, and thereby also reduce the amount of blade loads transferred from the blade 20 to the hub 18 via the blade root 22. This is because some of the blade loads are transferred to the blade connecting member 28 at the connection point 26, and these loads are then transferred to another blade 20 or to the hub 18 via a separate route, bypassing the blade root 22.

As described by way of background, increasing the length of a wind turbine blade 20 typically necessitates an increase in the diameter of the blade root 22 to provide more strength in the inboard portion 30 of the blade 20 to accommodate higher loads experienced by the longer blades in use. However, the wind turbine 10 described herein includes blade connecting members 28 which facilitate the use of longer wind turbine blades 20 without necessarily requiring an increase in blade root dimensions for structural purposes. As such, the use of blade connecting members 28 at least reduces the extent to which the blade root dimensions may be increased for longer blades 20 (compared to blades of a wind turbine that doesn't include blade connecting members), and in preferred examples, the use of blade connecting members 28 may advantageously facilitate an increase in blade length without increasing the blade root dimensions. As noted above, this is because some of the blade loads are unloaded, i.e. transferred, to the blade connecting member 28 at the connection point 26. As such, the swept area of the rotor 16 may be increased, meaning that more energy can be captured from the wind, without increasing the diameter of the blade root 22.

Referring still to FIG. 1, the wind turbine 10 also includes a tensioning system 32 for adjusting the tension in each blade connecting member 28. The tensioning system 32 comprises a plurality of linear actuators 34, and each linear actuator 34 is coupled between the hub 18 and a respective blade connecting member 28. The linear actuators 34 are configured to adjust the tension in their associated blade connecting member 28. For example, the linear actuator 34 may be adjusted in dependence on the tension in its associated blade connecting member 28, as will be described in more detail below.

Figure 2:
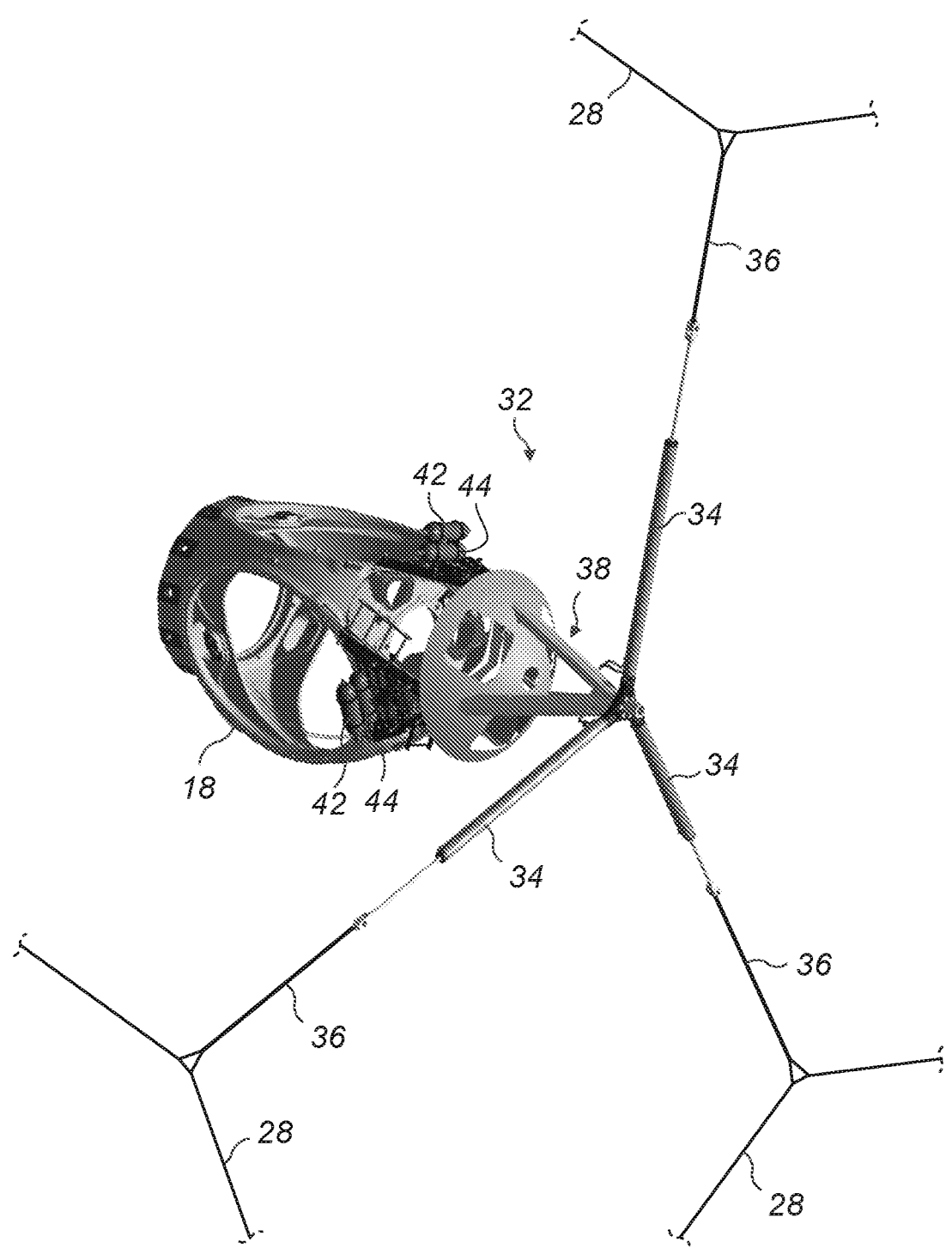
FIG. 2 is a schematic perspective view of the tensioning system and a hub of the wind turbine.

With additional reference to FIG. 2, which shows a schematic view of the hub 18 and tensioning system 32, in some examples, each linear actuator 34 may be coupled to a respective blade connecting member 28 via a separate tension member 36. The tension member 36 may be rigid, or alternatively the tension member 36 may be flexible. The inclusion of a tension member 36 may facilitate the use of a smaller, i.e. shorter, linear actuator 34 because the tension member 36 can be configured with a length to span the required distance between the linear actuator 34 and the blade connecting member 28. Additionally, coupling the linear actuator 34 to the blade connecting member 28 via a tension member 36 means that the mass of the linear actuator 34 is kept substantially inboard, i.e. near to the rotor axis, thereby reducing the rotational inertia of the rotor 16.

Each linear actuator 34 preferably has an adjustable length to facilitate adjustment of the tension in the blade connecting member 28. As such, in some examples, adjusting a linear actuator 34 to adjust the tension in a blade connecting member 28 may involve adjusting the length of the respective linear actuator 34. It will be appreciated that the length of a linear actuator 34 refers to the distance between points at which the actuator 34 is connected to other components of the wind turbine 10. A linear actuator 34 may be retracted, i.e. shortened, to increase the tension in a blade connecting member 28 to which the actuator 34 is coupled. It follows that the linear actuator 34 may be extended to reduce the tension in the blade connecting member 28.

In some examples, operation of the wind turbine 10 may involve setting a target blade connecting member tension and varying the length of the linear actuator 34 to achieve, or maintain, that target tension in the blade connecting member 28. For example, dependent on the tension in the blade connecting member 28 in use, the linear actuator 34 may be either extended or retracted to maintain the target tension in the blade connecting member 28.

In practice, adjusting the length of the linear actuator 34 changes the stiffness of the associated blade connecting member 28 (and in some examples also changes the stiffness of an associated tension member 36). Controlling the stiffness of the blade connecting member 28 relative to the stiffness of the inboard portion 30 of the blade 20 determines the distribution of loads between the inboard portion 30 of the blade 20 and the blade connecting member 28. For example, by increasing the stiffness of the blade connecting member 28 relative to the blade 20, a higher proportion of the blade loads may be transferred to the blade connecting member 28. This ensures that varying loads experience by the blade 20 in use are safely distributed between the blade root 22 and the blade connecting member 28. The stiffness of a blade connecting member 28 may be increased by retracting, i.e. shortening, the associated linear actuator 34, with the increased stiffness resulting in increased tension in the blade connecting member 28 as described above, because more load is transferred to the blade connecting member 28 from the blade 20.

The linear actuators 34 are preferably rotatably coupled to the hub 18. As such, the linear actuators 34 may be free to rotate relative to the hub 18 in preferred examples. This means that the linear actuators 34 can self-orientate in accordance with the tension in the tension member 36, which is particularly advantageous when the direction of the tension force varies in use. The linear actuator 34 therefore preferably maintains an orientation in which the extension axis of the actuator 34 is substantially co-axial with the tension force experienced by the linear actuator 34 during operation of the wind turbine 10. Orienting the linear actuator 34 and the tension member 36 in this way advantageously reduces fatigue in the tension member 36 because the tension forces are consistently directed along the longitudinal axis of the tension member 36. Such an orientation also reduces the risk of moment loads acting on the linear actuator 34 which could cause wear, damage, or misalignment issues in the actuator 34.

In some examples, the hub 18 may comprise an upwind hub extension 38, i.e. a part of the hub 18 that extends in an upwind direction. The linear actuators 34 may be coupled, for example rotatably coupled, to the upwind hub extension 38. This configuration can help to pull the wind turbine blades 10 upwind (via the tension in the blade connecting member 28 and tension member 36), reducing the risk of a blade 20 striking the tower 12 in strong wind conditions. This may also increase the stiffness of the wind turbine blade 20 in a spanwise direction, in particular this configuration may increase the stiffness of the inboard portion 30 of the blade 20.

As shown in FIG. 2, in preferred examples, the linear actuators 34 may be hydraulic actuators or pneumatic actuators, i.e. actuators driven by liquid pressure or gas pressure respectively. It follows that the linear actuators 34 may therefore extend and retract as a result of fluid pressure, i.e. liquid pressure or gas pressure. As will be described later in more detail, in preferred examples, the linear actuators 34 may extend and retract without any active electronic control input. For example, in use, the linear actuators 34 may extend and retract as a result of the tension force acting against the fluid pressure in the actuator 34.

Figure 3:
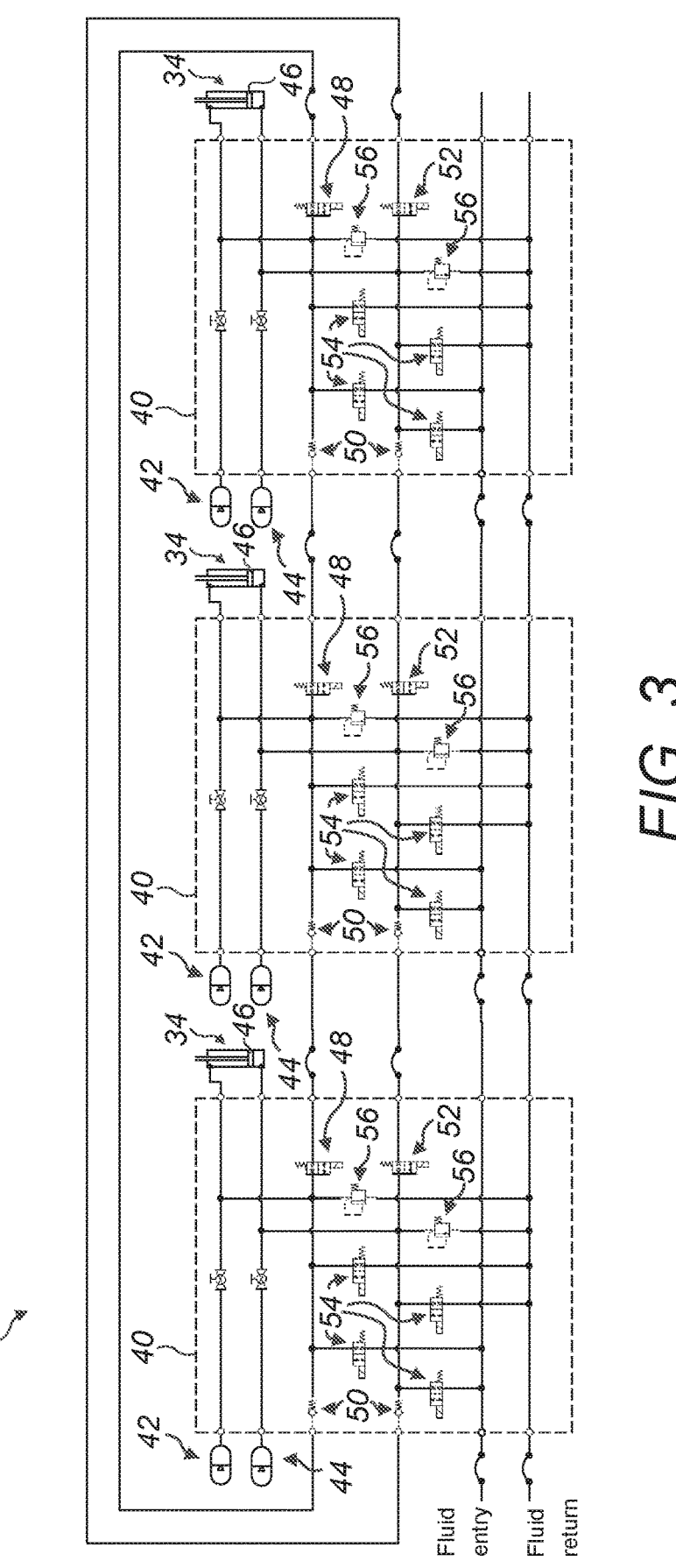
FIG. 3 is a fluid diagram describing an example of the tensioning system comprising hydraulic or pneumatic actuators.

Referring now to FIG. 3, this shows a fluid system diagram describing an example of the tensioning system 32 of the wind turbine 10. As shown in FIG. 3, the tensioning system 32 may include a plurality of stiffness-response systems 40, each of which is indicated schematically by the dashed perimeter lines in FIG. 3.

Each stiffness-response system 40 is preferably configured to control the stiffness of a blade connecting member 28 by controlling the fluid pressure in the associated linear actuator 34. As such, each stiffness-response system 40 preferably includes a source of high pressure fluid 42 and a source of low pressure fluid 44. The source of high pressure fluid 42 in the associated stiffness-response system 40 may be selectively fluidly coupled to a first side of a piston 46 in the linear actuator 34. It follows that the source of low pressure fluid 44 in the associated stiffness-response system 40 may be selectively fluidly coupled to a second side of the piston 46.

The position of the piston 46 within the linear actuator 34 may determine the length of the linear actuator 34. For example, moving the piston 46 within the linear actuator 34 may cause the actuator 34 to be extended or retracted. Movement of the piston 46 in the linear actuator 34 is resisted by the high and low pressure fluid on either side of the piston 46. The stiffness-response of the linear actuator 34 may therefore be controlled by controlling the pressure of the high pressure fluid and the pressure of the low pressure fluid.

As shown in FIG. 3, and with brief reference again to FIG. 2, in some examples the source of high pressure fluid 42 may be a high pressure accumulator and the source of low pressure fluid 44 may be a low pressure accumulator. The high and low pressure accumulators 44, 42 of each stiffness-response system 40 may be located within the hub 18 in some examples, or in other examples the accumulators 44, 42 may be mounted to the hub 18 or the inboard portion 30 of the blade 20. The pressure in the accumulators 42, 44 may determine the stiffness-response of the associated linear actuator 34. As such, the stiffness-response of the linear actuator 34 may be controlled by controlling the pressure in the high pressure accumulator 42 and/or the pressure in the low pressure accumulator 44. Additionally, the accumulators 42, 44 may provide a damping effect when the linear actuator 34 is extended or retracted as a result of the varying tension in the blade connecting member 28 in use.

In some examples, the sources of high pressure fluid 42 and/or the sources of low pressure fluid 44 may be selectively fluidly coupled to a hydraulic pitch mechanism (not shown) which is configured to adjust the pitch of a wind turbine blade 20. In some examples, this configuration may facilitate simple addition and removal of fluid from the sources of high and low pressure fluid 42, 44, for example during an initial phase of operating the wind turbine 10, following maintenance work, or to replace fluid lost in a leak, for example.

Referring still to FIG. 3, in some preferred examples, the sources of high pressure fluid 42 may be selectively fluidly coupled to one another. When the sources of high pressure fluid 42 are fluidly coupled to one another, the pressure in each of the sources of high pressure fluid 42 can be equalized, as will be described below in more detail. Further, the sources of low pressure fluid 44 may be selectively fluidly coupled to one another and such a configuration means that the pressure in each of the sources of low pressure fluid 44 can also be equalized.

Referring initially to the sources of high pressure fluid 42, the tensioning system 32 may include a plurality of regulator valves 48 via which the sources of high pressure fluid 42 may be selectively fluidly coupled and decoupled from one another. The stiffness-response systems 40 may each further include one or more one-way valves 50 to control the direction of fluid flow between the sources of high pressure fluid 42 of each stiffness-response system 40. In an initial phase, before the wind turbine 10 is operated to generate electricity, the regulator valves 48 may be opened to fluidly couple the sources of high pressure fluid 42 to one another. Similarly, the regulator valves 52 may be opened to fluidly couple the sources of low pressure fluid 44 to one another. The rotor 16 may then be idled or rotated. In examples comprising pitchable wind turbine blades 20, this may involve rotating the pitchable wind turbine blades 20 into a feathered position so that the wind does not drive the rotor 16. Coupling of the sources of low pressure fluid or the sources of high pressure fluid may also be conducted during operation if required.

By rotating the rotor 16, the loads experienced by the blades 20 will vary throughout the cycle, for example due to the varying force of weight acting on the blades 20 when the blades 20 are in different positions during rotation of the rotor 16. It follows that the tension in the blade connecting members 28 also varies during rotation of the rotor 16. Accordingly, the linear actuators 34 and the stiffness-response systems 40 of each actuator 34 will also experience varying tension and pressures respectively. When opened, the regulating valves 48 allow the high pressure fluid to flow between each of the stiffness-response systems 40. The regulating valves 48 may be configured to open and close to respectively permit and block fluid communication between the sources of high pressure fluid 42 until the pressure in each of the sources of high pressure fluid 42 is substantially the same, i.e. equalized. It will be appreciated that the equalized pressure in the sources of high pressure fluid 42 is preferably an average pressure, i.e. a mean pressure, experienced by the sources of high pressure fluid 42 during the rotation of the rotor 16.

Following pressure equalization, the sources of high pressure fluid 42 are preferably uncoupled, i.e. fluidly isolated from one another, such that each stiffness-response system 40 acts as an individual system with an associated linear actuator 34 and blade connecting member 28 during operation of the wind turbine 10. The linear actuators 34 are preferably configured with a stroke length, i.e. the maximum variable length, that accommodates the variations in tension, and the variations in pressure above and below the equalized pressure, during operation of the wind turbine 10.

It will be appreciated that the above-described process for equalizing the pressure in the sources of high pressure fluid 42 is equally applicable for equalizing the pressure in the sources of low pressure fluid 44 using regulating valves 52. As such, description of the pressure equalization process for the sources of low pressure fluid 44 will not be repeated herein for conciseness. In preferred examples, the pressures in the sources of low pressure fluid 44 are equalized at the same time, i.e. in the same initial phase of operating the wind turbine 10, as when the pressures are equalized in the sources of high pressure fluid 42.

Fluid may be introduced into each stiffness-response system 40 via a fluid entry. Fluid may be removed from each stiffness-response system 40 via a fluid return. Each stiffness-response system 40 preferably includes one or more controllable valves 54 between the respective linear actuator 34 and the fluid entry and fluid return, as shown in FIG. 3. The controllable valves 54 help to ensure that fluid access to an external supply of fluid can be controlled for each stiffness-response system 40. As such, the stiffness-response system 40 can be isolated from the external supply (fluid entry/return) during normal operation of the wind turbine. This reduces the risk of fluid leaks, saves energy, and ensures that the linear actuator 34 and associated stiffness-response system 40 can act as a damper during operation of the wind turbine 10. This in turn helps to increase the longevity of the tensioning system 32, and in particular reduces fatigue of the linear actuator components, the tension member 36 and the blade connecting member 28.

As shown in FIG. 3, in some examples each stiffness-response system 40 may include one or more over-pressure release valves 56. The over-pressure release valves 56 facilitate fluid communication with the fluid return to reduce the pressure in the sources of high or low pressure 42, 44, if the pressure in these sources is raised above a predetermined level. The over-pressure release valves 56 therefore help to facilitate safe and reliable operation of the tensioning system 32.

The wind turbine 10 described herein and the associated methods of operating the wind turbine 10, provide a number of advantages over wind turbines of the prior art. As already described above, the blade connecting members 28 unload, i.e. transfer, some of the loads experienced by a blade 20 in use to bypass the inboard portion 30 and blade root 22. This enables the use of larger, i.e. longer, wind turbine blades 20 without requiring an increase in the dimensions and strength of the root 22 of the blade 20, or with a smaller increase in dimensions and strength of the root 22 of the blade 20 compared to a wind turbine without blade connecting members 28. Accordingly, the diameter of a rotor 16 can be increased, without necessarily increasing the size of the rotor hub 18 and the associated interface with the blades 20 or with a smaller increase in the size of the rotor hub 18 and the associated interface with the blades 20.

Further, as described above, the tensioning system 32 and methods of operating the wind turbine 10 enable control of the distribution of blade loads between the inboard portion 30 and root 22 of the blade 20 and the blade connecting member 28. In particular, the linear actuators 34 are configured to adjust the stiffness and tension in their associated blade connecting members 28, meaning that the tension in a blade connecting member 28 can be maintained within a safe range. By facilitating adjustment of the stiffness and tension of the blade connecting members 28, the linear actuators 34 of the tensioning system 32 help to ensure that varying loads experience by the blade 20 in use can be distributed evenly between the inboard portion 30 of the blade 20 and the associated blade connecting member 28. Further, by facilitating adjustment of the stiffness and tension of the blade connecting members 28, the tensioning system 32 advantageously helps to maintain a given tension in the blade connecting members 28, despite varying factors during operation of the wind turbine 10. For example, the stiffness and tension of the blade connecting members 28 may be adjusted using the tensioning system 32 to account for manufacturing tolerances, material creep over time, and changes in material properties due to temperature variations, to name only a few factors.

The description provided herein serves to demonstrate a plurality of possible examples of the present invention. Features described in relation to any of the examples above may be readily combined with any other features described with reference to different examples without departing from the scope of the invention as defined in the appended claims.

The invention claimed is:

1. A wind turbine comprising:

a tower;

a nacelle mounted on the tower;

a rotor mounted to the nacelle, the rotor comprising a hub and at least three wind turbine blades, each blade extending between a root and a tip, and each blade further comprising a connection point located between the root and the tip;

a plurality of blade connecting members, each blade connecting member being connected between corresponding connection points of a pair of wind turbine blades; and a tensioning system for adjusting the tension in each blade connecting member, the tensioning system comprising a plurality of linear actuators, each linear actuator being coupled between the hub and a respective blade connecting member, and each linear actuator being configured to adjust the tension in the blade connecting member, wherein the linear actuators are hydraulic actuators or pneumatic actuators, and each of the plurality of linear actuators comprise a piston, wherein the tensioning system further comprises a plurality of stiffness-response systems, each respective stiffness-response system of the stiffness-responses systems associated with a respective linear actuator of the plurality of linear actuators and comprising a source of high pressure fluid being selectively coupled to a first side of the piston of the respective linear actuator and a source of low pressure fluid being selectively coupled to a second side of the piston of the respective linear actuator.

2. The wind turbine of claim 1, wherein each linear actuator has an adjustable length to facilitate adjustment of the tension in the blade connecting member.

3. The wind turbine of claim 1, wherein the source of high pressure fluid is a high pressure accumulator and the source of low pressure fluid is a low pressure accumulator, the pressure in the high and low pressure accumulators determining the stiffness-response of the linear actuator.

4. The wind turbine of claim 1, wherein the sources of high pressure fluid are selectively fluidly coupled to one another, and/or wherein the sources of low pressure fluid are selectively fluidly coupled to one another.

5. The wind turbine of claim 1, wherein each linear actuator is coupled to a respective blade connecting member via a separate tension member.

6. The wind turbine of claim 5, wherein each linear actuator is rotatably coupled to the hub such that the linear actuator is free to rotate relative to the hub to self-orientate in accordance with the tension in the tension member.

7. A method of operating a wind turbine, the wind turbine comprising:

a tower;

a nacelle mounted on the tower;

a rotor mounted to the nacelle, the rotor comprising a hub and at least three wind turbine blades, each blade extending between a root and a tip, and each blade further comprising a connection point located between the root and the tip;

a plurality of blade connecting members, each blade connecting member being connected between corresponding connection points of a pair of wind turbine blades; and a tensioning system comprising a plurality of linear actuators, each linear actuator being coupled between the hub and a respective blade connecting member;

the method comprising:

adjusting each linear actuator in dependence on the tension in the respective blade connecting member to thereby adjust the tension in the blade connecting member;

wherein each linear actuator has an adjustable length, and wherein adjusting each linear actuator comprises adjusting the length of the respective linear actuator to thereby adjust the tension in the blade connecting member;

wherein the linear actuators are hydraulic actuators or pneumatic actuators, and wherein, in use, the linear actuators extend and retract as a result of pressure, without any active electronic control input;

wherein each linear actuator comprises a piston, and wherein the tensioning system further comprises a plurality of stiffness-response systems, each respective stiffness-response system of the stiffness-responses systems associated with a respective linear actuator of the plurality of linear actuators and comprising a source of high pressure fluid being selectively coupled to a first side of the piston of the respective linear actuator and a source of low pressure fluid being selectively coupled to a second side of the piston of the respective linear actuator.

8. The method of claim 7, further comprising setting a target blade connecting member tension and, dependent on the tension in the blade connecting member in use, either a) extending the linear actuator, or b) retracting the linear actuator, to maintain the target tension in the blade connecting member.

9. The method of claim 7, wherein the source of high pressure fluid is a high pressure accumulator and the source of low pressure fluid is a low pressure accumulator, and wherein controlling the stiffness-response of the linear actuator comprises controlling the pressure in the high pressure accumulator and/or the pressure in the low pressure accumulator.

10. The method of claim 9, wherein the sources of high pressure fluid are selectively fluidly coupled to one another, and wherein the sources of low pressure fluid are selectively fluidly coupled to one another, the method further comprising:

equalising the pressure in the sources of high pressure fluid by fluidly coupling the sources of high pressure fluid to one another, rotating the rotor through at least one full rotation, and subsequently fluidly uncoupling the sources of high pressure fluid from one another; and equalising the pressure in the sources of low pressure fluid by fluidly coupling the sources of low pressure fluid to one another, rotating the rotor through at least one full rotation, and subsequently fluidly uncoupling the sources of low pressure fluid from one another.

* * * * *